(12) United States Patent
Yasufuku et al.

(10) Patent No.: US 6,264,506 B1
(45) Date of Patent: Jul. 24, 2001

(54) CARD CONNECTION ADAPTER

(75) Inventors: Kaori Yasufuku; Taiji Hosaka, both of Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 09/553,151

(22) Filed: Apr. 20, 2000

(30) Foreign Application Priority Data

Apr. 23, 1999 (JP) ................................. 11-116814

(51) Int. Cl.[7] ................................................ H01R 25/00
(52) U.S. Cl. ........................................ 439/638; 439/945
(58) Field of Search .................................. 361/737, 801, 361/802; 439/945, 946, 638, 327, 630, 928.1

(56) References Cited

U.S. PATENT DOCUMENTS

| | | | |
|---|---|---|---|
| 5,155,663 | 10/1992 | Harase | 361/395 |
| 5,184,282 | * 2/1993 | Kaneda et al. | 361/395 |
| 5,375,037 | 12/1994 | Le Roux | 361/684 |
| 5,752,857 | * 5/1998 | Knights | 439/638 |
| 5,955,722 | * 9/1999 | Kurz et al. | 235/479 |
| 5,993,261 | * 11/1999 | Klatt et al. | 439/630 |
| 6,075,706 | * 6/2000 | Learmonth et al. | 361/737 |
| 6,075,709 | * 6/2000 | Yang | 361/756 |

FOREIGN PATENT DOCUMENTS

| | | |
|---|---|---|
| 297 22 142 U1 | 2/1998 | (DE) . |
| 2 741 976 | 6/1997 | (FR) . |

* cited by examiner

*Primary Examiner*—Brian Sircus
*Assistant Examiner*—Son V. Nguyen
(74) *Attorney, Agent, or Firm*—Rader, Fishman & Grauer

(57) ABSTRACT

A card connection adaptor to be used for connecting a card slot compliant with a first standard to a card compliant with a second standard by fitting the card in the card slot. The adaptor includes: a first connector for signal transfer to and from the card slot; a second connector for signal transfer to and from the card; and a card-shaped housing. The housing has first and second covers and a frame held between the first and second covers. The housing is formed with a card retaining space for retaining therein the card, and has a card insertion port provided on one end face thereof and communicating with the card retaining space. The first cover is formed with a cut-away portion recessed from the card insertion port in a card insertion direction and having a greater width than the card.

13 Claims, 13 Drawing Sheets

F I G. 11A
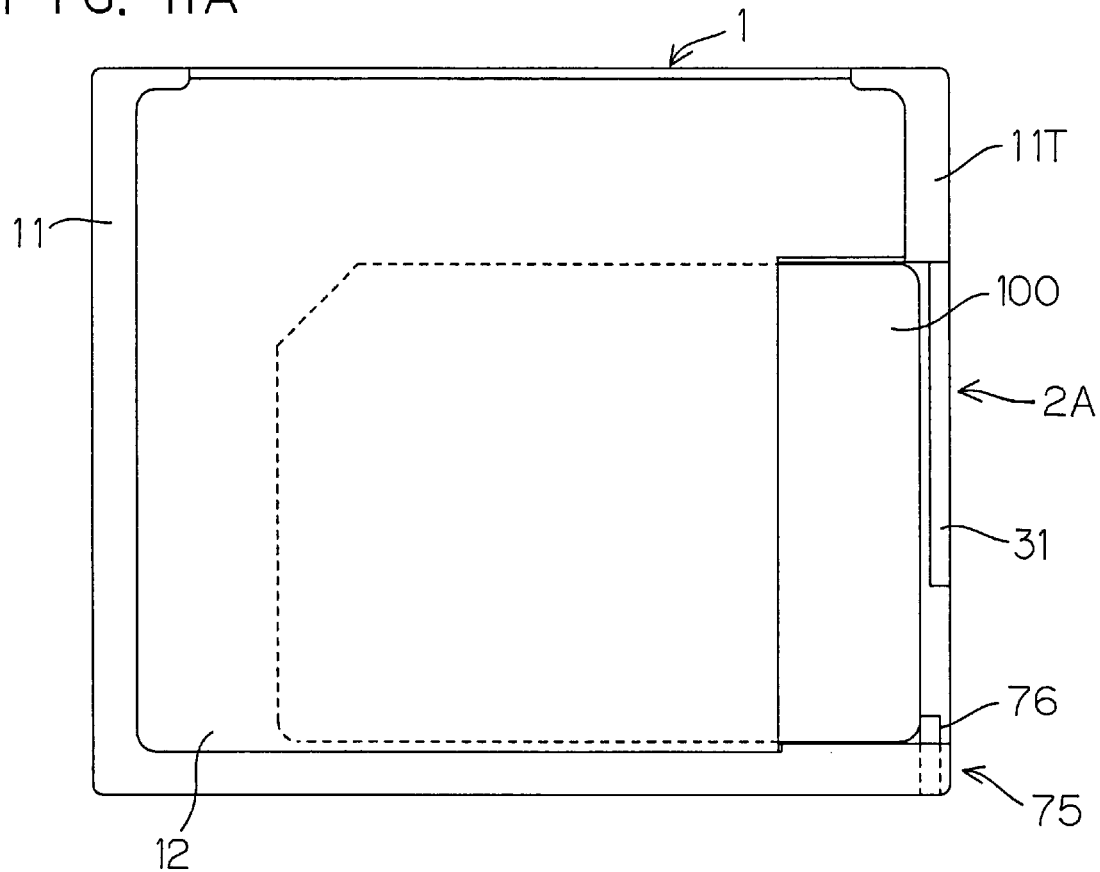
F I G. 11B
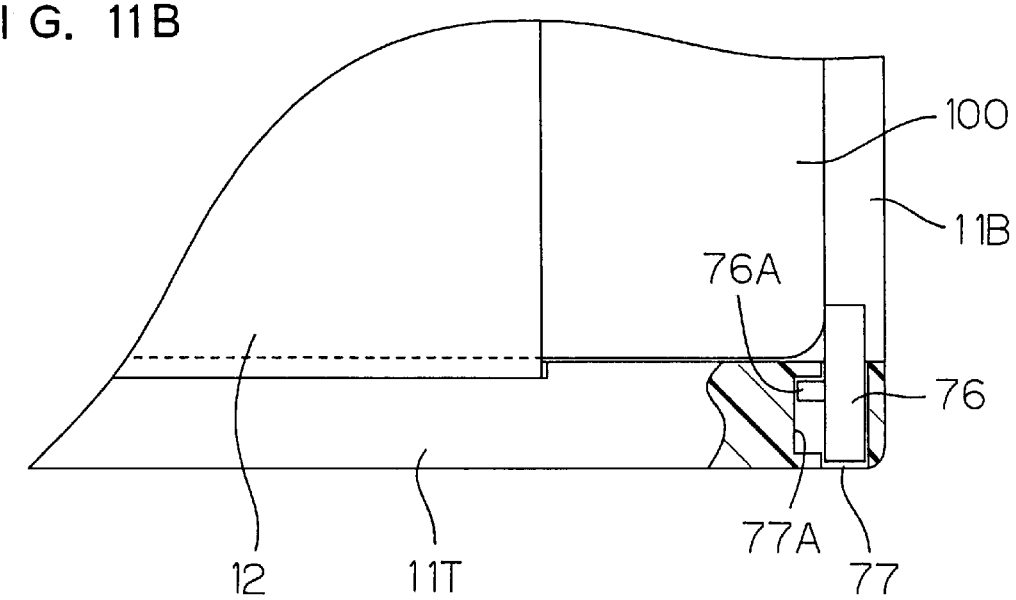

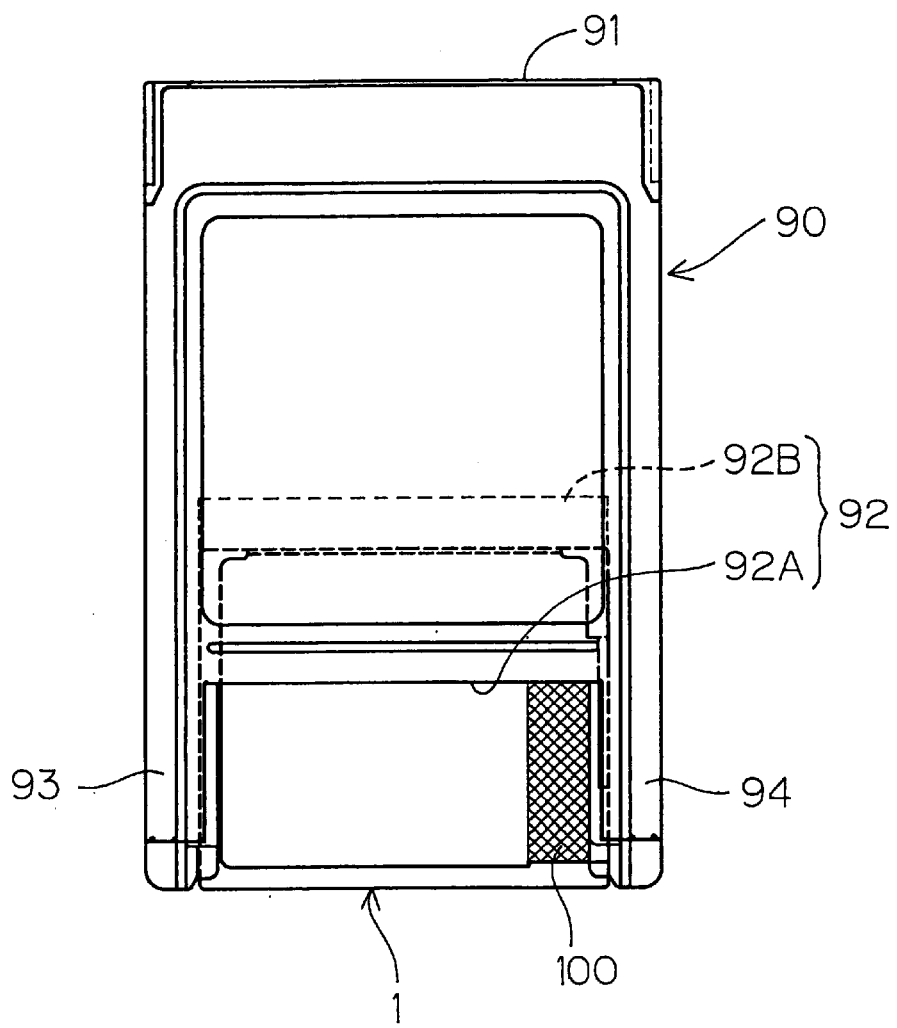
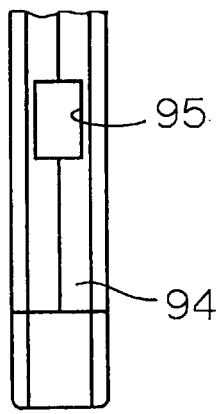
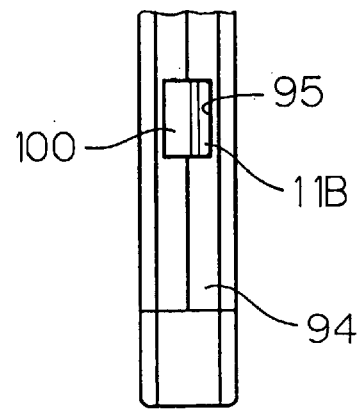
FIG. 13A
FIG. 13B
FIG. 13C

CARD CONNECTION ADAPTER

BACKGROUND OF THE INVENTION

1. Field of the Invention

The present invention relates to a card connection adaptor for connecting an IC card such as a memory card or a functional extension card to an information system such as a personal computer, or a portable information system represented by a PDA (personal digital assistant), a digital still camera and a digital video camera.

2. Description of Related Art

Recent notebook PCs (personal computers) are generally equipped with PC card slots. Functional extension of such a notebook PC can be achieved by inserting a PC card into the PC card slot. Exemplary PC cards include flash memory cards, modem cards and SCSI cards.

The PC cards are designed in compliance with the PC Card Standard, and classified into three types which have thicknesses of 3.3 mm (Type I), 5.0 mm (Type II) and 10.5 mm (Type III), respectively, with a rectangular plan shape of 54.0-mm width and 85.6-mm length.

For smaller-size information systems such as digital cameras, electronic organizers and portable phones, smaller-size CF (CompactFlash (registered trade mark) ) cards are employed instead of the PC cards to meet a heavy demand for size reduction. Typical examples of the CF cards are flash memory cards which are employed to store image data picked up by digital cameras and schedule data and address data for electronic organizers.

The CF cards are designed in compliance with the CFA (CompactFlash Association) Standard and classified into two types which have thicknesses of 3.3 mm (Type I) and 5.0 mm (Type II), respectively, with a rectangular plan shape of 36.4-mm width and 42.8-mm length.

Further, the digital cameras, digital voice recorders and portable phones employ small-size memory cards adapted only for memory functions. Such a small-size memory card includes a memory IC die packaged by resin-sealing, and is characterized by its extremely small thickness. Examples of the small-size memory cards include SmartMedia (SM (registered trade mark)), Miniature Card, MemoryStick and MultiMedia Card.

These cards have outer dimensions as shown below.

| | |
|---|---|
| SmartMedia (SM): | 37 × 45 × 0.76 (mm) |
| Miniature Card (MC): | 38 × 33 × 3.5 (mm) |
| MemoryStick (MS): | 50 × 21.5 × 2.8 (mm) |
| MultiMedia Card (MMC): | 32 × 24 × 1.4 (mm) |

Since the smaller-size information systems do not always have a sufficient data processing capability, it is often necessary to load image data picked up by a digital camera into a notebook PC for editing the data or to transfer data between an electronic organizer and a notebook PC.

However, when data retained in the small-size information system is to be loaded into the notebook PC via a CF card or a small-size memory card, for example, such a card cannot directly be fitted in the PC card slot of the notebook PC because the PC card slot is designed in compliance with the PC Card Standard.

Therefore, card connection adaptors are conventionally provided for connecting a CF card or a small-size memory card to a PC card slot.

Such a card connection adaptor includes a housing having a shape conformal to the PC card, a first connector provided on a front edge of the housing for connection to a PC card slot, and a second connector provided within the housing for connection to a CF card or a small-size memory card. A card retaining space for receiving the CF card or the small-size memory card is provided within the housing. The card retaining space opens to a rear face of the housing as seen in an insertion direction in which the card connection adaptor is inserted into the PC card slot. Where the small-size card has a thickness close to the thickness of the card connection adaptor, the card retaining space may also open to the upper and/or lower side of the housing. In any case, the small-size card is inserted into the card connection adaptor from the rear side of the card connection adaptor in the same direction as the adaptor insertion direction in which the card connection adaptor is inserted into the PC card slot.

However, this arrangement has drawbacks from mechanical and electrical viewpoints. More specifically, when the card connection adaptor is fitted in the PC card slot, a rear portion of the small-size card fitted in the card connection adaptor is exposed from an opening of the PC card slot. Hence, there is a possibility that the small-size card is disconnected from the card connection adaptor by some external force. If the small-size card is disconnected during data transfer between the information system and the small-size card, the data transfer is of course failed, and destruction of date or destruction of elements inside the small-size card due to erroneous signal input may result. This is particularly problematic in the case of a card (e.g., a LAN card or a modem card) which is designed for leading signal input/output interconnections therefrom. Further, it is difficult to provide a retention mechanism in the card connection adaptor for assuredly holding the small-size card, whereas it is easy to provide a retention mechanism in the PC card slot for holding a card inserted therein.

Since it is physically possible to insert the small-size card into the card connection adaptor from the rear side thereof with the card connection adaptor fitted in the PC slot card, a user may make an attempt to insert the small-size card into the card connection adaptor in this state. In such a case, a great external force is exerted onto the connector of the PC card slot, so that the connector may be damaged.

In addition, there is a possibility that the small-size card is inserted into or withdrawn from the card connection adaptor fitted in the PC card slot when the information system is energized. Therefore, in designing the card connection adaptor, a consideration should be given to prevent the small-size card from being damaged by so-called active card insertion and withdrawal. More specifically, connection terminals of the card connection adaptor should accurately be positioned so that connection terminals of the small-size card can be connected to or disconnected from the connection terminals of the card connection adaptor in substantially the same connection/disconnection order and in substantially the same connection/disconnection timing when the small-size card is inserted into or withdrawn from the card connection adaptor. When the small-size card is to be inserted into the card connection adaptor, for example, connection of a grounding terminal, a source terminal, a first signal terminal, a second terminal and so forth should be established in the order named within an allowable connection timing range. It is, therefore, extremely difficult to design the card connection adaptor which can provide a guarantee against the active insertion and withdrawal.

SUMMARY OF THE INVENTION

To solve these problems, the inventors of the present invention proposed a card connection adaptor in Japanese Patent Application No. 11-13333 (1999) (corresponding to U.S. patent application Ser. No. 09/264,564) previously filed, the card connection adaptor having a card insertion port which opens in a direction generally perpendicular to an adaptor insertion direction in which the card connection adaptor is inserted into a card slot, and adapted to receive the card from the card insertion port. With this arrangement, the card cannot be inserted into or withdrawn from the card connection adaptor with the card connection adaptor being fitted in the card slot. Therefore, all the aforesaid problems can be solved.

A housing of the card connection adaptor according to the prior application includes upper and lower covers and a frame. The upper and lower covers and the frame are formed with cut-away portions of the same configuration on a face of the housing adjacent to the card insertion port. Thus, a user can hold the card fitted in the card connection adaptor by his fingers to withdraw the card from the card connection adaptor.

With this arrangement, however, a front edge of the card should correctly be aligned with the card insertion port with the card being oriented parallel to the card connection adaptor when the card is to be inserted into the card connection adaptor. Therefore, the card inserting operation is not necessarily easy.

A wiring board formed with signal conversion circuitry for signal conversion between different card standards is retained inwardly of the frame. However, the provision of the cut-away portion in the frame limits the space for provision of circuit components. Where a card connection adaptor for fitting a MultiMedia card in a type-I CF card slot is to be constructed, for example, the space for the provision of the circuit components is insufficient even with the use of the smallest circuit components such as a chip-size package.

The CF card has misinsertion prevention keys provided on side faces thereof along the card insertion direction for preventing the CF card from being inserted into the card slot in a wrong orientation. However, where the cut-away portion is formed in the frame as described above, the misinsertion prevention keys should be provided away from the cut-away portion. Therefore, the misinsertion prevention keys have an insufficient length, or the cut-away portion is provided in a limited position.

It is a first object of the present invention to provide a card connection adaptor which ensures easy insertion of a card.

It is a second object of the present invention to provide a card connection adaptor which has a smaller thickness.

It is a third object of the present invention to provide a card connection adaptor which has advantageous misinsertion prevention keys.

In accordance with the present invention to attain the aforesaid objects, there is provided a card connection adaptor for connecting a card slot compliant with a predetermined first standard to a card compliant with a second standard which is different from the first standard by fitting the card in the card slot, the card connection adaptor comprising: a first connector compliant with the first standard for signal transfer to and from the card slot; a second connector compliant with the second standard for signal transfer to and from the card compliant with the second standard; and a card-shaped housing which holds the first connector and the second connector; the housing having first and second covers, a frame held between the first and second covers, a card retaining space defined in the housing for retaining therein the second-standard-compliant card, and a card insertion port provided on one end face thereof and communicating with the card retaining space; the first cover formed with a cut-away portion recessed from the card insertion port in a card insertion direction and having a greater width than the second-standard-compliant card.

With this arrangement, the housing of the card connection adaptor has the first and second covers and the frame. The first cover is formed with the cut-away portion having a greater width than the width of the card (which is measured perpendicularly to the card insertion direction in which the card is inserted into the card retaining space). Therefore, when the card is inserted into the card connection adaptor, the card can be inclined upward with respect to the first cover. A front edge of the inclined card is brought into a card insertion space from the cut-away portion, and then the card is oriented generally parallel to the card connection adaptor for insertion of the card into the card retaining space.

This obviates the need to initially orient the card parallel to the card connection adaptor and the need to correctly align the front edge of the card with the card insertion port, thereby drastically facilitating the card inserting operation.

It is preferred that the frame and the second cover have no cut-away portion conformal to the cut-away portion of the first cover adjacent the card insertion port. Thus, a sufficient space can be reserved for provision of circuit components constituting signal processing circuitry for mutual signal conversion between the first and second standards. Therefore, this arrangement is advantageous for thickness reduction of the card connection adaptor. Since the card retaining space is completely covered with the second cover on one side of the card, the components within the adaptor and the card fitted in the card retaining space can effectively be protected.

The card retaining space may be defined between the frame and the first cover. In this case, the adaptor preferably further comprises a guide portion exposed from the cut-away portion for guiding the front edge of the second-standard-compliant card with respect to the card insertion direction toward the card retaining space.

With this arrangement, the card can smoothly be guided into the card retaining space by bringing the front edge of the card into contact with the guide portion from the cut-away portion. The guide portion may be a part of the frame or a part of other component such as a wiring board, or may be constructed as a separate component.

The frame may hold signal conversion circuitry for signal conversion between the first standard and the second standard between the card retaining space and the second cover.

With this arrangement, the frame need not have a cut-away portion, so that a sufficient space can be reserved in the frame to accommodate the circuit components constituting the signal conversion circuitry. This allows for thickness reduction of the card connection adaptor.

The second cover may have a protector extending to a position opposed to the cut-away portion of the first cover for protection of the inside of the card connection adaptor.

With this arrangement, the components within the adaptor and the card retained in the card retaining space can virtually entirely be protected on one side of the adaptor.

The card insertion port may open in a direction generally perpendicular to an adaptor insertion direction in which the card connection adaptor is inserted into the card slot.

With this arrangement, the card insertion direction in which the second-standard-compliant card is inserted into the adaptor is generally perpendicular to the adaptor insertion direction.

With this arrangement, the second-standard-compliant card cannot be inserted into and withdrawn from the adaptor along the adaptor insertion direction. With the card connection adaptor being fitted in the card slot, there is no possibility that the second-standard-compliant card is disconnected from the card connection adaptor, and the second-standard-compliant card cannot be inserted into or withdrawn from the card connection adaptor. Accordingly, an excessively large external force is not needlessly exerted on a connector of the card slot. Since the active insertion and withdrawal of the second-standard-compliant card with respect to the card connection adaptor can be prohibited, there is no need to provide a guarantee against the active insertion and withdrawal. Therefore, the card connection adaptor is easier to design.

A misinsertion prevention key is preferably provided on an end face of the frame adjacent to the card insertion port for preventing the card connection adaptor from being inserted into the card slot in a wrong orientation.

In the present invention, the frame need not have a cut-away portion conformal to the cut-away portion of the first cover. Therefore, even where the card insertion port opens perpendicularly to the adaptor insertion direction, the misinsertion prevention key can advantageously be provided on the end face of the frame. Thus, the misinsertion of the card connection adaptor can effectively be prevented.

The first cover preferably has a fold-back portion formed along an edge thereof defining the cut-away portion by folding back an edge portion thereof into the card retaining space.

The fold-back portion is preferably provided along an edge of the first cover extending perpendicularly to the card insertion direction.

This arrangement prevents an user from being injured by the edge of the first cover, and prevents the card inserted into the card retaining space from being damaged by the edge. Since there is no possibility that the card is damaged, the fold-back portion can be utilized as a guide for the insertion of the card. This ensures easier insertion of the card.

The adaptor preferably further comprises a card lock mechanism to be brought into abutment against a rear edge of the card retained in the card retaining space for prevention of withdrawal of the card.

With this arrangement, the card connection adaptor fitted with the card can more easily be handled. That is, there is no possibility that the card is withdrawn from the adaptor even without any special attention.

The card lock mechanism may include an abutment portion provided retractably with respect to the card insertion port, and a biasing member for resiliently biasing the abutment portion toward the card insertion port. In this case, the biasing member may be a coil spring or a plate spring, or may be comprised of a resilient piece formed integrally with the frame. Further, the abutment portion and the biasing member such as the resilient piece may be provided as a unitary member. The card lock mechanism may be constructed by utilizing a so-called earth clip. Although the earth clip is mainly used for connecting the card to an earth terminal of the card slot, the earth clip may be worked to form a plate spring as the biasing member and the abutment portion integral with the plate spring.

The card lock mechanism may comprise a lock piece having an abutment portion which is manually displaceable in a retractable manner with respect to the card insertion port.

The card connection adaptor preferably has a card shape conformal to the first-standard-compliant card slot. That is, the housing preferably has substantially the same card-like exterior shape as the first-standard-compliant card. In this case, "the direction generally perpendicular to the adaptor insertion direction" is preferably a direction parallel to upper and lower faces of the card-shaped adaptor.

The first connector is preferably provided on an end face of the adaptor to be opposed to the connector of the card slot.

The second connector is preferably provided in a position which allows the second connector to be brought into contact with terminals of the second-standard-compliant card retained in the card retaining space.

It is preferred that the card retaining space does not open to the rear side of the adaptor with respect to the adaptor insertion direction. That is, at least the rear side of the adaptor is preferably closed so that the second-standard-compliant card cannot be inserted or withdrawn from the rear side.

The connector of the card slot is preferably adapted to be contact-connected to the first connector.

The card slot may be a PC-standard memory card slot. In this case, the PC-standard memory card slot means a card slot which may commonly be provided in a personal computer. Examples of such a card slot include those which are compliant with the PC Card Standard and the CF Card Standard. These standards stipulate that an input/output control circuit for controlling data input and output be provided in the card. For example, such an input/output control circuit is adapted to control writing and reading of data with respect to a memory IC incorporated in the card.

The card retaining space is preferably configured so as not to allow the second-standard-compliant card to project outwardly of the card retaining space when the card is retained in the card retaining space.

The card connection adaptor may further include a wiring board provided within the housing, wherein the first connector, the second connector and the signal conversion circuitry are mounted on the wiring board.

The housing may include a resin frame and a metal cover which covers the resin frame.

The signal conversion circuitry may include a pin configuration conversion circuit for converting a pin configuration between a first-standard-compliant card and the second-standard-compliant card.

The signal conversion circuitry may include a signal processing circuit for signal conversion between a signal on the first-standard-compliant card and a signal on the second-standard-compliant card to ensure inter-standard compatibility.

The second-standard-compliant card may be a memory card which incorporates therein a memory IC and has a data storage function.

The first standard may be a standard which stipulates that the input/output control circuit be provided in the card to be inserted into the card slot.

In this case, the first standard stipulates that the input/output control circuit be present in the card and, therefore, either the card connection adaptor or the second-standard-compliant card should have the input/output control circuit. Where the card connection adaptor has the input/output control circuit, the signal conversion circuitry preferably includes the input/output control circuit.

Examples of cards designed in compliance with standards which stipulate that the input/output control circuit be present in a card include a PC card, a CF card, a small PC card (SPC with exterior dimensions of 42.8×45×5.0 (mm)).

The signal conversion circuitry may include an input/output control circuit for performing an input/output control with respect to the second-standard-compliant card.

With this arrangement, the input/output control circuit is provided in the card connection adaptor and, therefore, the second standard may be a standard which stipulates that the input/output control circuit be present in the card slot, or a standard which stipulates that the input/output control circuit be present in the card. Examples of cards designed in compliance with standards which stipulate that the input/output control circuit be present in a card slot include SmartMedia, MultiMedia Card, Miniature Card, MemoryStick and SIM (subscriber identity module) cards.

Where the second standard is a standard which stipulates that the input/output control circuit be provided in the second-standard-compliant card, the card connection adaptor need not have a data input/output control function. Therefore, the signal conversion circuitry may merely include the pin configuration conversion circuit for the conversion of the pin configuration.

The foregoing and other objects, features and effects of the present invention will become more apparent from the following description of the preferred embodiments with reference to the attached drawings.

BRIEF DESCRIPTION OF THE DRAWINGS

FIGS. 11A and 11B are diagrams illustrating a fifth card lock mechanism;

FIGS. 13A, 13B and 13C are diagrams illustrating the construction of another adaptor suitable for use with the card connection adaptor according to the aforesaid embodiment.

DESCRIPTION OF THE PREFERRED EMBODIMENTS

Figure 1:
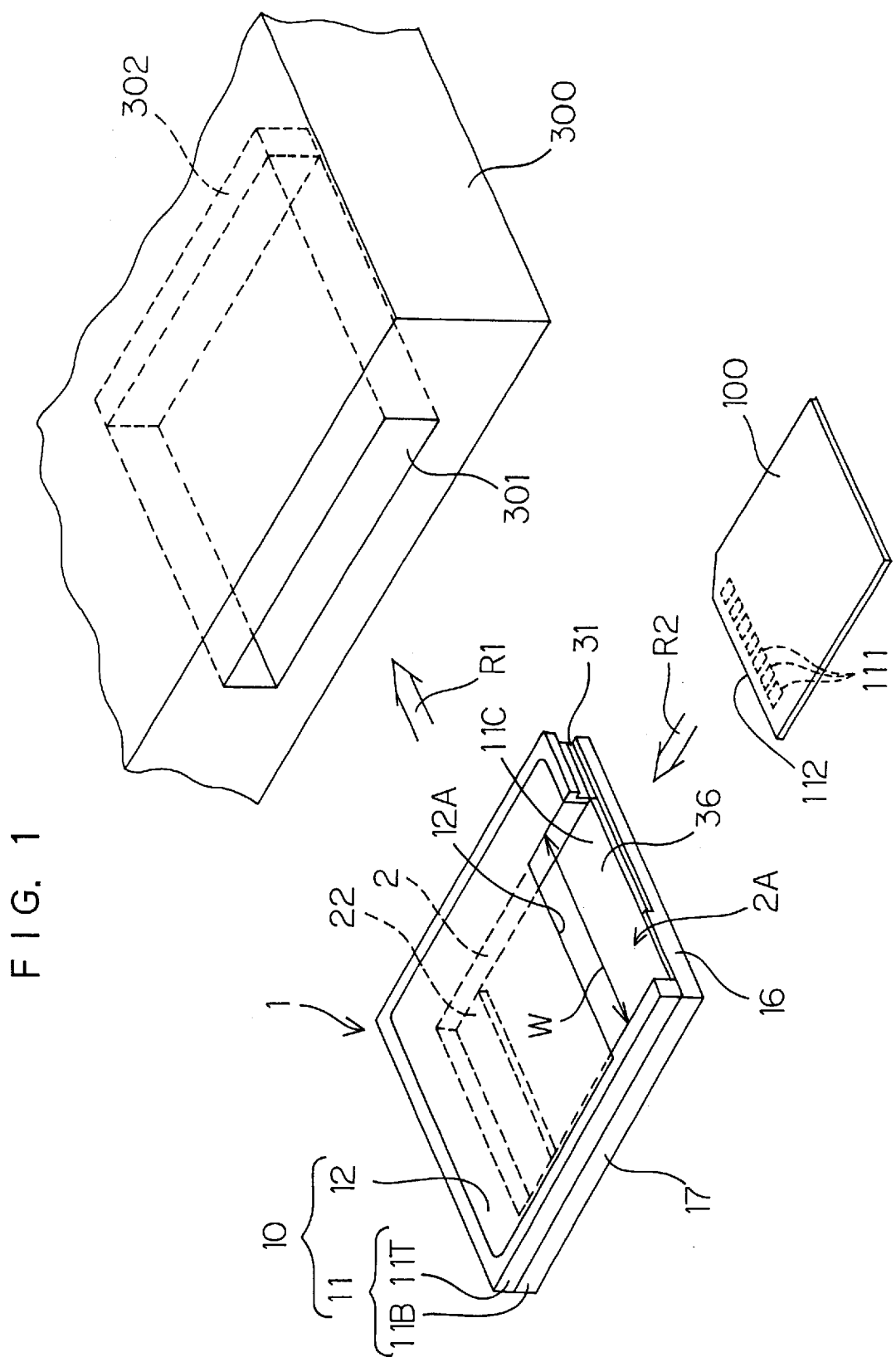
FIG. 1 is a perspective view illustrating the external construction of a card connection adaptor according to one embodiment of the present invention.

FIG. 1 is a perspective view illustrating the external construction of a card connection adaptor 1 according to one embodiment of the present invention.

The card connection adaptor 1 (hereinafter referred to simply as "adaptor 1") has an external shape conformal to a card compliant with the Type-I CF Card Standard (first standard), i.e., a Type-I CF card. The adaptor 1 has a card retaining space 2 for retaining therein a card 100 compliant with the MultiMedia Card Standard (second standard), i.e., a MultiMedia card. When the card 100 is inserted in the card retaining space 2 for connection to the adaptor 1, the card 100 is accommodated within the card retaining space 2 without outward projection, so that the adaptor 1 connected to the card 100 constitutes the Type-I CF card as a whole. Therefore, the adaptor 1 can be fitted in a CF card slot 301 provided in an information system 300 such as an electronic organizer for use.

Figure 2:
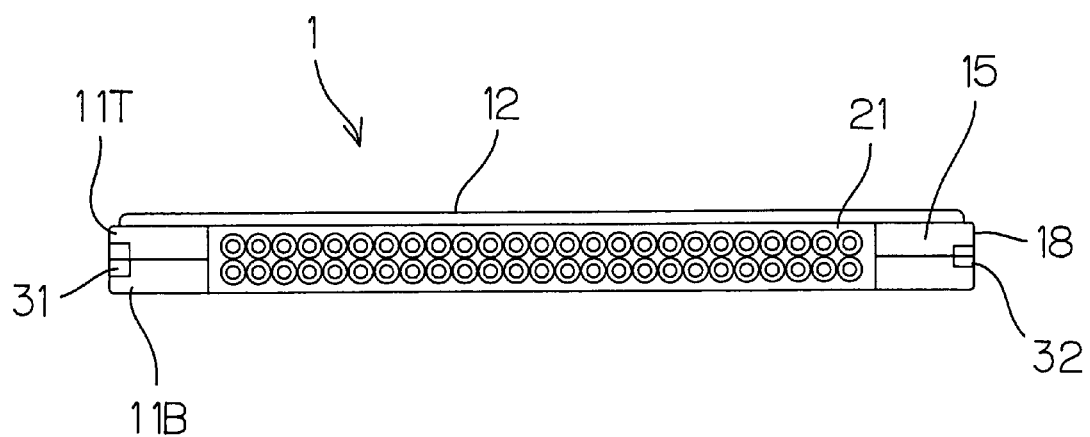
FIG. 2 is a rear view of the card connection adaptor as seen from the side of a slot connector of the card connection adaptor.

The adaptor 1 includes a housing 10 which has a card-like exterior shape defined by a resin frame 11 and first and second metal covers 12 and 13 (see FIG. 3) respectively covering upper and lower faces of the frame 11 (in a state as shown in FIG. 1). A female connector 21 (first connector) which is to be contact-connected to a male connector 302 provided in the CF card slot 301 is provided on a front face 15 of the housing 10 as shown in FIG. 2. The card retaining space 2 formed in the housing has a card insertion port 2A which opens to one side face 16 of the housing adjoining to the face 15. The card retaining space 2 is closed except the side face 16, so that insertion and withdrawal of the card 100 can be achieved only through the card insertion port 2A.

The card 100 is a generally rectangular thin planar card having a memory IC resin-sealed therein and a plurality of terminals (seven terminals) 111 exposed on a bottom face thereof. The card is dimensioned in compliance with the MultiMedia Card Standard to have a length of 32 mm, a width of 24 mm and a thickness of 1.4 mm. The terminals 111 are arranged in a line along a front edge 112 of the card. One corner on the front edge 112 of the card is beveled so as to prevent the card 100 from being inserted into the adaptor in a wrong orientation.

A card connector (second connector) 22 which is to be electrically connected to the terminals 111 of the card 100 is disposed in the innermost of the card retaining space 2 (as seen from the card insertion port 2A).

Therefore, the card 100 is mechanically and electrically connected to the adaptor 1 by inserting the card 100 into the adaptor 1 from the card insertion port 2A. When the adaptor 1 with this state is inserted into the CF card slot 301 for mechanical and electrical connection thereto, the card 100 is mechanically and electrically connected to the CF card slot 301 via the adaptor 1.

The slot connector 21 which is to be connected to the CF card slot 301 is provided on the front face 15 to be opposed to the CF card slot 301. Since the card insertion port 2A for insertion of the card 100 is formed on the side face 16, an adaptor insertion direction R1 in which the adaptor 1 is inserted into the CF card slot 301 is perpendicular to a card insertion direction R2 in which the card 100 is inserted into the adaptor 1. Therefore, a rear face 17 of the housing 10 is exposed from the CF card slot 301 with the adaptor 1 fitted in the CF card slot 301. That is, the card retaining space 2 is closed to the outside by the rear face 17.

This prevents the card 100 from being inadvertently disconnected from the adaptor 1 fitted in the CF card slot 301. Since the insertion and withdrawal of the card 100 is not possible with the adaptor 1 being fitted in the CF card slot 301, there is no fear of exerting a large external force on the connector 302 of the CF card slot 301, and the card 100 is prohibited from being in advertently withdrawn from the adaptor 1 by a user. The insertion and withdrawal of the card 100 is possible only when the adaptor 1 is removed from the CF card slot 301. Therefore, there is no need to provide a guarantee against the insertion and withdrawal of the card 100 in a power active state where the adaptor 1 is electrically connected to the information system 300 (i.e., active insertion and withdrawal). This is advantageous in that the adaptor 100 is easier to design.

The upper metal cover 12 has a rectangular cut-away portion 12A which is recessed from the card insertion port 2A in the card insertion direction R2. The cut-away portion 12A has a greater width W than the card 100 as measured perpendicularly to the card insertion direction R2.

The frame 11 and the lower metal cover 13 are formed with no cut-away portion conformal to the cut-away portion 12A. A portion of the metal cover 13 opposed to the cut-away portion 12A serves as a protector for protecting internal circuit components and the inserted card 100 in the cut-away portion 12A.

The frame 11 includes an upper frame member 11T and a lower frame member 11B joined together (for example, by ultrasonic fusion-bonding), and an inner frame member 11C provided therein. The inner frame member 11C has a guide portion 36 exposed from the cut-away portion 12A for guiding a front edge 112 of the card 100 into the card retaining space 2. The inner frame member 11C may be provided as a separate member from the upper frame member 11T and the lower frame member 11B, but is formed integrally with the upper frame member 11T in this embodiment.

The upper frame member 11T is partly cut away adjacent the card insertion port 2A, but the lower frame member 11B have no cut-away portion. Therefore, the frame 11 as a whole has no cut-away portion conformal to the cut-away portion 12A of the metal cover 12.

A misinsertion prevention key 31 (groove) is provided along a boundary between the upper frame member 11T and the lower frame member 11B on the side face 16 of the frame 11. Since the upper frame member 11T is partly cut away adjacent the card insertion port 2A, only a lower half of the misinsertion prevention key 31 is provided on the lower frame member 11B adjacent the card insertion port 2A. The misinsertion prevention key 31 extends halfway to the card insertion port 2A. With the card 100 being fitted in the card retaining space 2, a rear face of the card 100 serves as part of the misinsertion prevention key.

Similarly, a misinsertion prevention key 32 (see FIG. 2) is provided on the opposite side face 18 of the adaptor, but has a width different from the misinsertion prevention key 31 on the side face 16. Misinsertion prevention keys (not shown) are respectively provided on opposite side walls of the card slot 301 to be engaged with the misinsertion prevention keys 31 and 32. Thus, the card connection adaptor 1 is prevented from being inserted into the card slot 301 in a wrong orientation.

Figure 3:
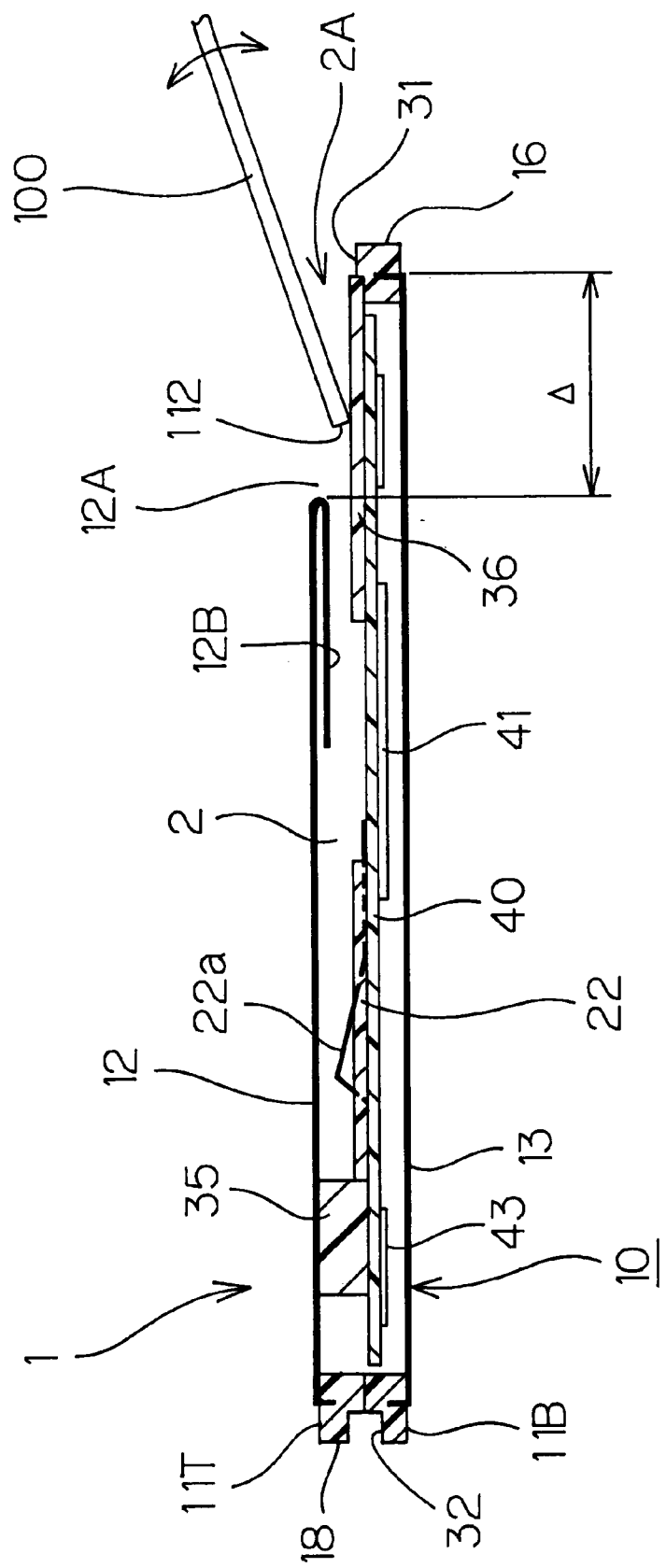
FIG. 3 is a sectional view of the card connection adaptor taken along a section line extending in a card insertion direction.
Figure 4:
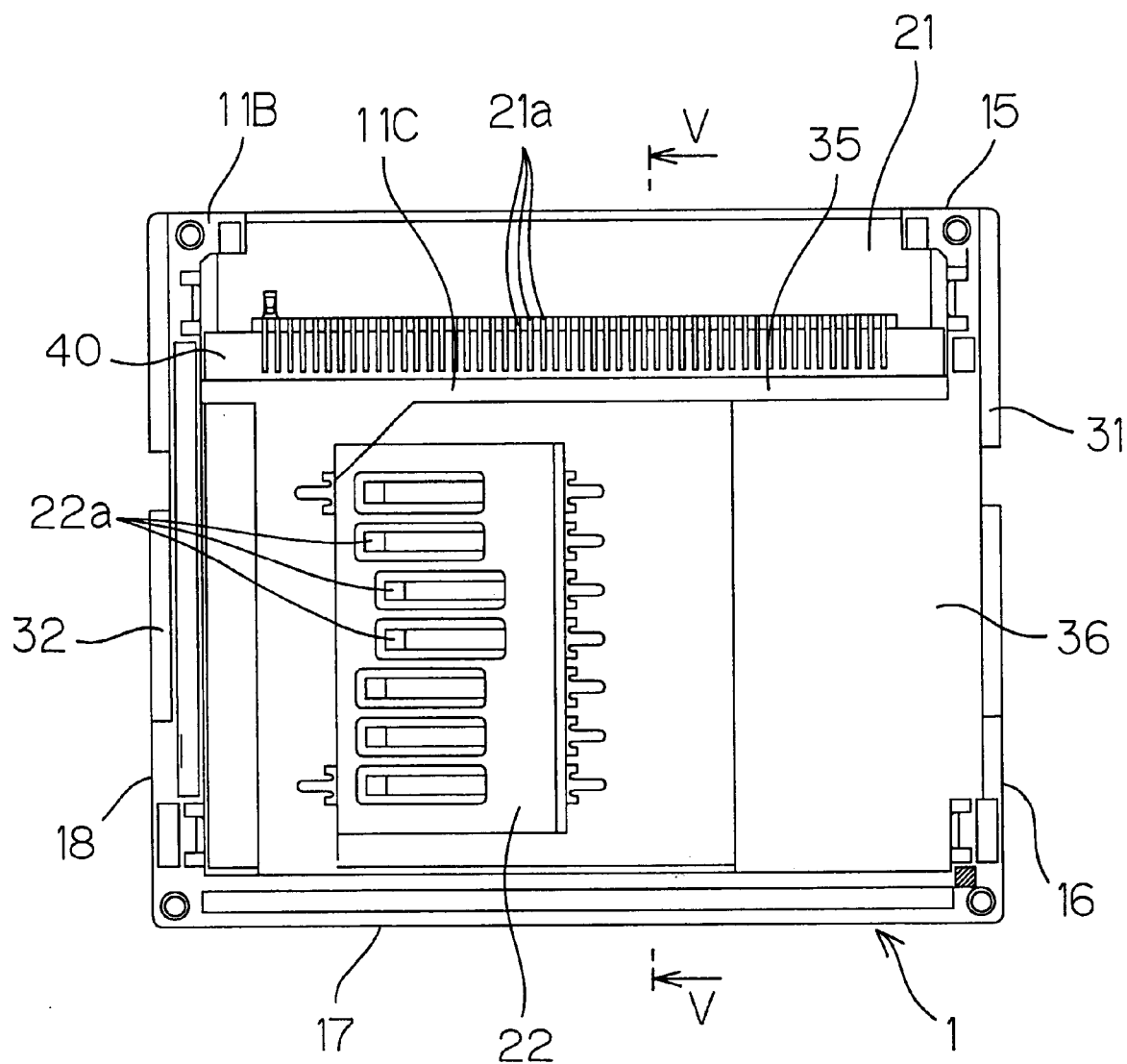
FIG. 4 is a plan view illustrating the internal construction of the card connection adaptor as seen through an upper metal cover.
Figure 5:
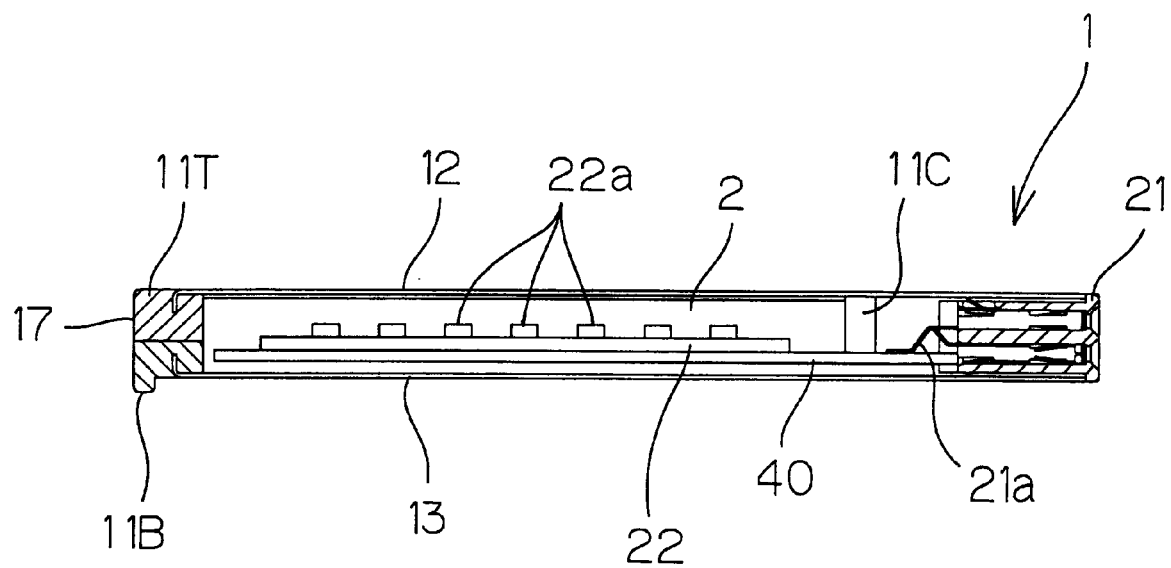
FIG. 5 is a sectional view taken along a section line V—V in FIG. 4.

FIG. 3 is a sectional view of the adaptor taken along a section line extending in the card insertion direction R2, and FIG. 4 is a plan view illustrating the internal construction of the adaptor as seen through the upper metal cover 12. FIG. 5 is a sectional view taken along a section line V—V in FIG. 4.

The upper frame member 11T is molded on the metal cover 12 for integration therewith. Similarly, the lower frame member 11B is molded on the metal cover 13 for integration therewith. Then, the upper frame member 11T integrated with the metal cover 12 and the lower frame member 11B integrated with the metal cover 13 are joined together by ultrasonic fusion-bonding for formation of the housing 10. The cut-away portion 12A of the metal cover 12 is formed by folding back a portion 12B of the metal cover 12. More specifically, the portion of the metal cover 12 folded back toward the card retaining space 2 extends along an edge of the metal cover 12 defining the cut-away portion 12A. This prevents the user from being injured by the edge of the metal cover 12 which is otherwise sharp, and prevents the card 100 inserted into the card retaining space 2 from being damaged by the edge. Since there is no possibility that the card 100 is damaged, the fold-back portion can be utilized as a guide for the insertion of the card.

The upper frame member 11T and the lower frame member 11B define an opening on the front face 15 of the adaptor 1, and the opening serves as a connector fitting portion in which the slot connector 21 is fitted.

As shown in FIGS. 3 and 5, a generally rectangular wiring board 40 is held between the lower metal cover 13 and the inner frame member 11C. Leads 21a of the slot connector 21 are soldered on one edge portion of the wiring board 40, whereby the slot connector 21 is mechanically and electrically connected to the wiring board 40. Since the slot connector 21 is retained between the upper and lower metal covers 12 and 13, the one edge of the wiring board 40 is supported via the slot connector 21. The card connector 22 is mounted adjacent an edge of the wiring board 40 opposite from the card insertion port 2A.

The inner frame member 11C has a generally L-shaped support frame portion 35, and the guide portion 36 integrally connected to the support frame portion 35 adjacent the card insertion port 2A. The support frame portion 35 has a greater thickness, and has a lower face abutting against the wiring board 40 and an upper face abutting against an interior surface of the upper metal cover 12. The guide portion 36 is a thin planar plate extending along the side face 16, and has a greater width than the cut-away portion 12A of the upper metal cover 12.

The card connector 22 mounted on the wiring board 40 faces to the card retaining space 2 between the support frame portion 35 and the guide portion 36.

The card retaining space 2 is virtually defined by the lower face of the upper metal cover 12, an interior side wall of the support frame portion 35 of the inner frame member 1C, the upper face of the guide portion 36 of the inner frame member 11, and an upper face of the card connector 22.

The card connector 22 includes seven terminals 22a corresponding to the seven terminals 111 provided on the bottom face of the card 100. The terminals 22a are each comprised of a conductor having a spring-like property. When the card 100 is inserted into the card retaining space 2, the terminals 22a are brought into abutment against the bottom face (the terminals 111 and a resin portion) of the card 100, and resiliently deformed toward the wiring board 40, whereby the insertion of the card 100 in the adaptor is permitted. The seven terminals 22a are pressed against the corresponding terminals 111 of the card 100 by their spring force to establish the electrical connection therebetween. The seven terminals 22a are connected to circuitry formed on the wiring board 40.

As shown in FIG. 3, the front edge 112 of the card 100 to be inserted from the card insertion port 2A is brought into contact with a surface of the guide portion 36. The cut-away portion 12A of the upper metal cover 12 is recessed in the card insertion direction R2, and has a greater width than the card 100 as measured perpendicularly to the card insertion direction R2. Therefore, the card 100 can brought into contact with any position within a range Δ of the recess of the cut-away portion 12A on the guide portion 36. The card 100 may be oriented at any angle with respect to the guide portion, as long as the front edge of the card can be brought into contact with the guide portion 36.

Therefore, the card 100 can be handled very easily at the initial stage of the insertion of the card 100 into the card retaining space 2, and there is no need to exactly align the card 100 with the adaptor 1.

Then, the card 100 is brought into parallel to the metal cover 12 of the adaptor 1 and inserted inward into the card retaining space 2. Thus, the card 100 can easily be fitted in the adaptor.

Figure 6:
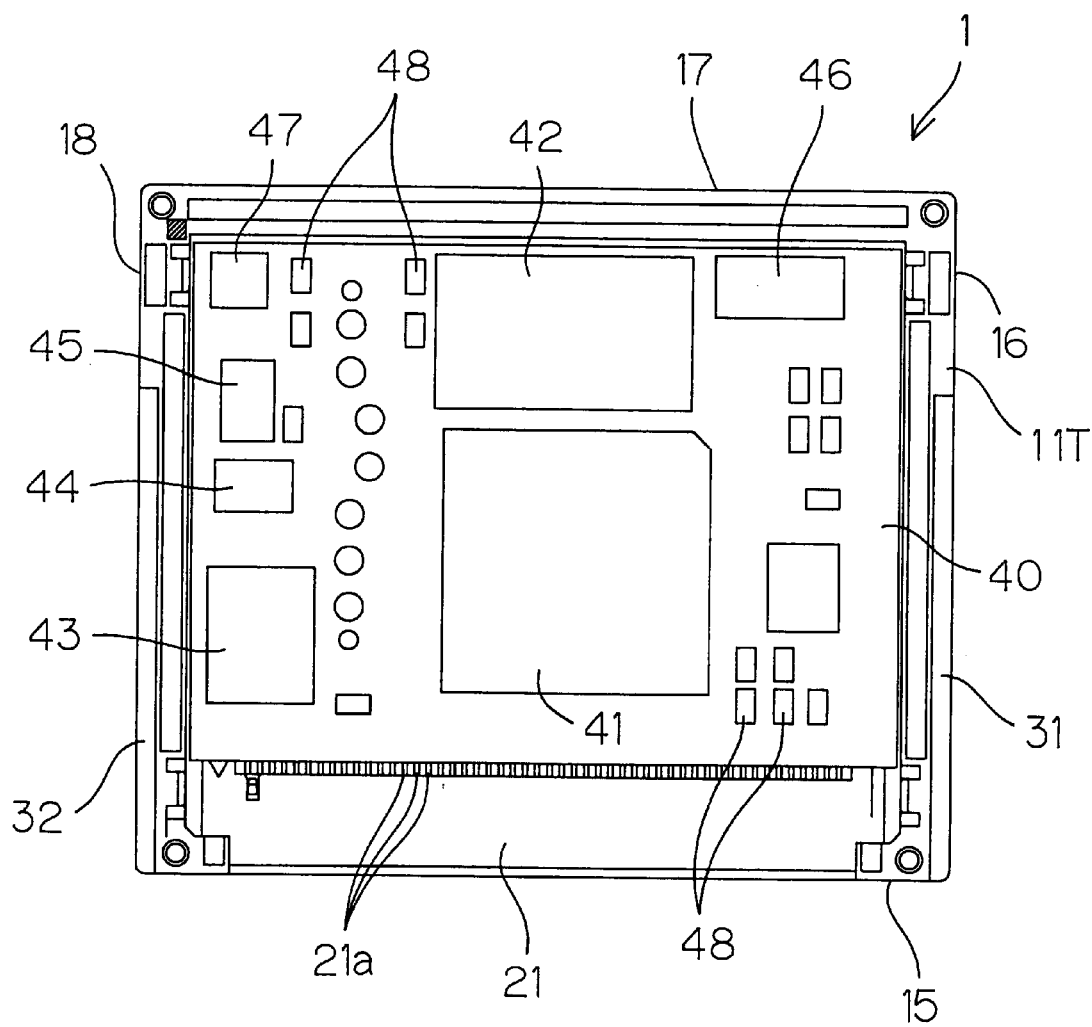
FIG. 6 is a bottom view illustrating the internal construction of the card connection adaptor as seen through a lower metal cover.

FIG. 6 is a bottom view illustrating the internal construction of the adaptor 1 as seen through the lower metal cover 13. Signal conversion circuitry for performing signal conversion between the first standard and the second standard is provided on a lower surface of the wiring board 40 opposite from the card retaining space 2. More specifically, a control IC 41, an EEPROM 42, a power source IC 43, a filtering circuit 44, electrolytic capacitors 45, 46, an oscillator circuit 47, and other circuit elements 48 such as a chip resistor and a chip capacitor are mounted on the wiring board 40 to constitute the signal conversion circuitry. Interconnection conductor lines (not shown) as circuit interconnections are provided on the surface of the wiring board 40. For thickness reduction of the adaptor 1, ICs such as the control IC 41 and the EEPROM 42 are preferably each comprised of a chip size package IC. Further thickness reduction can be achieved by surface-mounting of the respective circuit components.

The signal conversion circuitry performs pin configuration conversion between the slot connector 21 compliant with the first standard and the card connector 22 compliant with the second standard, and performs signal processing for signal conversion between these standards. The signal conversion circuitry includes an input/output control circuit for controlling data input and output of the card 100 which incorporates therein the memory IC.

The MultiMedia card and the CF card have a 7-pin configuration and a 50-pin configuration, respectively, with different numbers of pins. Therefore, at least some of signals transferred therebetween should be altered, because the signal conversion cannot be achieved only through the simple pin configuration conversion.

In this embodiment, the frame 11 and the lower metal cover 13 are formed with no cut-away portion, so that the wiring board 40 is allowed to have a greater substrate area. Thus, a sufficient space can be reserved for provision of the circuit components. This allows for thickness reduction of the adaptor 1 in compliance with the Type-I CF Card Standard.

Next, an explanation will be given to a card lock mechanism applicable to the adaptor 1. In the adaptor 1 of the aforesaid construction, the card 100 fitted in the card retaining space 2 is retained in the card retaining space 2 by the resilient force of the terminals 22a of the card connector 22. That is, the terminals 22a come into press contact with the card 100, whereby the card 100 is held between the terminals 22a and the interior surface of the metal cover 12.

Even with this arrangement, the adaptor 1 can hold the card 100. In consideration of a case where the adaptor fitted with the card 100 is carried around, it is preferred that the adaptor can more assuredly hold the card 100.

Figure 7:
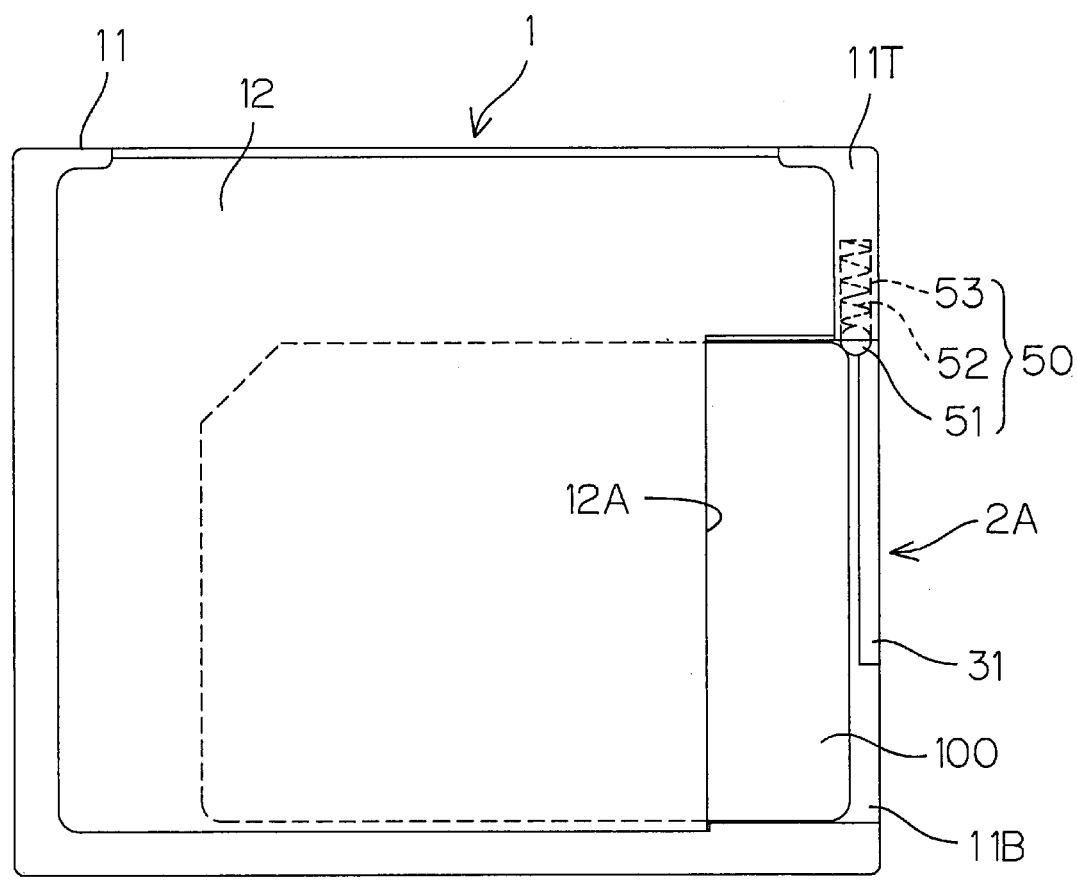
FIG. 7 is a diagram illustrating a first card lock mechanism.

FIG. 7 illustrates a first card lock mechanism 50. The card lock mechanism 50 includes a ball 51 (abutment portion) retractably provided as facing to the card insertion port 2A, and a coil spring 52 biasing the ball 51 toward the card insertion port 2A. The coil spring 52 is accommodated in a recess 53 formed laterally of the card insertion port 2A in the upper frame member 11T of the frame 11. One end of the coil spring 52 is fixed in a boss (not shown) formed in the innermost of the recess 53. The ball 51 is fixed to the other end of the coil spring 52 by welding or the like. About half of the ball 51 projects in the card insertion port 2A.

In the course of the insertion of the card 100 into the card retaining space 2, a side face of the card 100 is brought into abutment against the ball 51 to compress the coil spring 52, whereby the ball 51 is retracted into the recess 53. When the card 100 is completely inserted into the card retaining space 2, the ball 51 abuts against one of rounded corners on the rear edge of the card 100. That is, the ball 51 restricts movement of the card 100 in a card withdrawing direction in abutment against the rear edge of the card 10. Thus, the card 100 can assuredly be held in the adaptor.

Upon the complete insertion of the card 100 into the card insertion space 2, the ball 51 comes out of the recess 53 by the resilient force of the coil spring 52 to abut against the corner on the rear edge of the card 100. Thus, a user can get a so-called tactile feedback to clearly recognize that the card 100 has completely been inserted into the adaptor. This prevents incomplete insertion of the card 100 and forcible over-insertion of the card 100, eliminating the possibility of poor contact between the card 100 and the adaptor 1 or breakage of the card connector 22 or the like due to the forcible insertion.

When the card 100 is to be withdrawn from the adaptor, an external force is applied to the card 100 in the card withdrawing direction, whereby the coil spring 52 is compressed to retract the ball 51 away from the card insertion port 2A. Thus, the withdrawal of the card 100 can be achieved.

The recess 53 is formed in the surface of the upper frame member opposed to the lower frame member 11B. The coil spring 52 is incorporated in the upper frame member in an unexposed state by joining the upper and lower frame members 11T, 11B together by ultrasonic fusion-bonding after fitting the coil spring 52 in the recess.

Figure 8A:
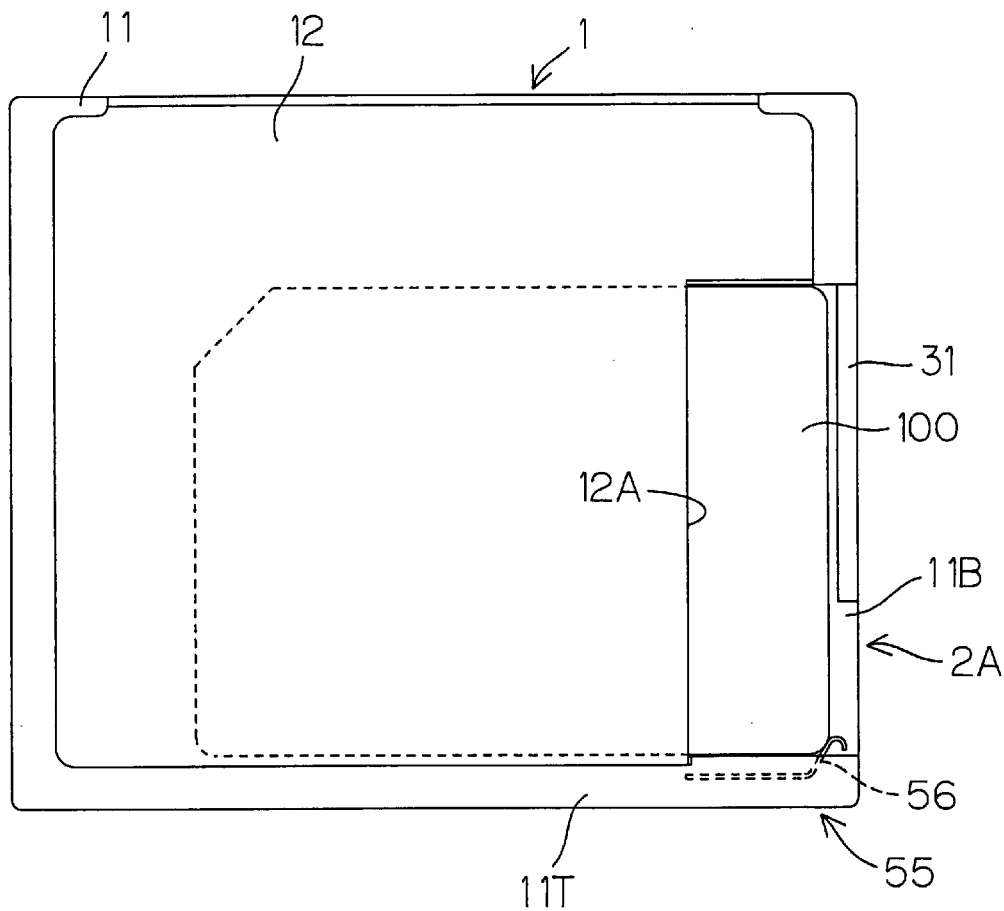
FIGS. 8A and 8B are diagrams illustrating a second card lock mechanism.
Figure 8B:
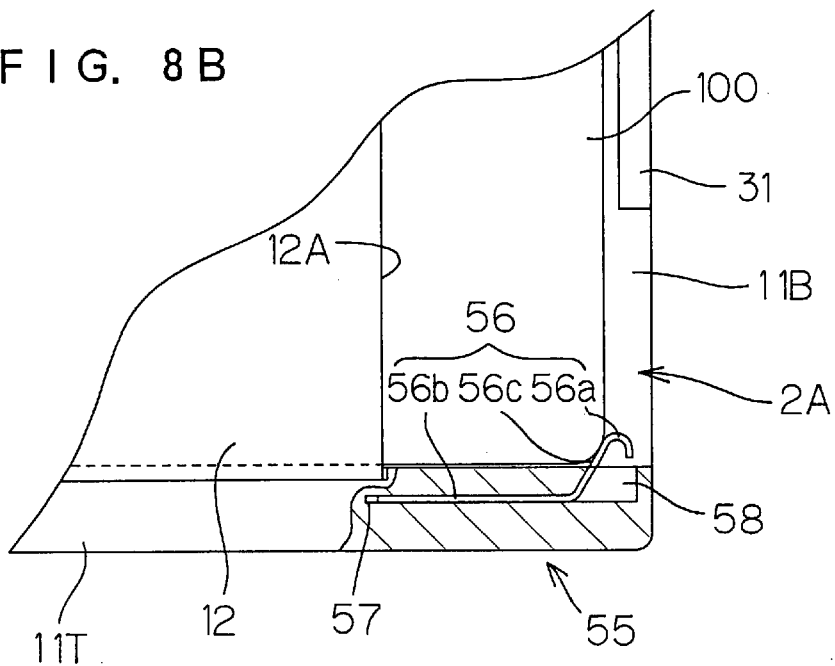

FIGS. 8A and 8B illustrate a second card lock mechanism 55. The card lock mechanism 55 includes a plate spring 56 to be resiliently brought into contact with one of the rounded corners on the rear edge of the card 100 inserted in the card retaining space 2. The plate spring 56 is press-fitted in a press-fit groove 57 formed in the lower surface of the upper frame member 11T (opposed to the lower frame member 11B). Therefore, most portion of the plate spring is unexposed to the outside after the upper and lower frame members 11T, 11B are joined together by ultrasonic fusion-bonding.

The plate spring 56 has a fixed portion 56b press-fitted in the press-fit groove 57, a bent linkage portion 56c extending from the fixed portion 56b toward the card insertion port 2A, and an abutment portion 56a curved from the linkage portion 56c as projecting toward the card insertion port 2A. The abutment portion 56a projects toward the card insertion port 2A. A recess 58 is formed in the upper frame member 11T to communicate with the press-fit groove 57, so that the linkage portion 56c can resiliently be deformed in the recess 58. Thus, the abutment portion 56a can be retracted from the card insertion port 2A.

In the course of the insertion of the card 100, a force is exerted on the abutment portion 56a from a side edge of the card 100 to resiliently deform the plate spring 56, so that the abutment portion 56a is retracted into the recess 58. When the card 100 is completely inserted in the card retaining space 2, the abutment portion 56a comes out of the recess into the card insertion port 2A by the recovering force of the plate spring 56 to abut against a corner on the rear edge of the card 100. Thus, the card 100 is prevented from being displaced in the card withdrawing direction thereby to be assuredly retained in the adaptor 1.

By pulling the card 100 with a relatively large external force, the plate spring 56 is resiliently deformed to retract the abutment portion 56a from the card insertion port 2A, whereby the card 100 can be withdrawn from the adaptor.

This arrangement provides substantially the same effects as the aforesaid first card lock mechanism 50.

Figure 9A:
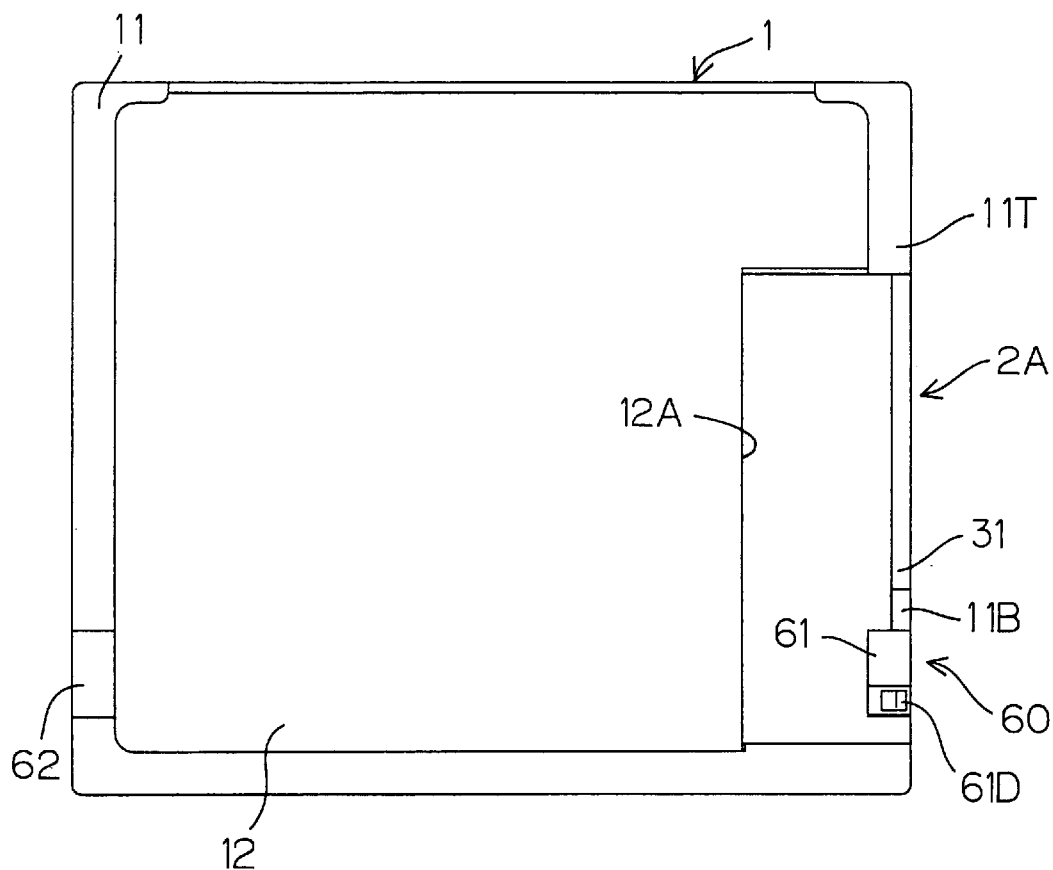
FIGS. 9A and 9B are diagrams illustrating a third card lock mechanism.
Figure 9B:
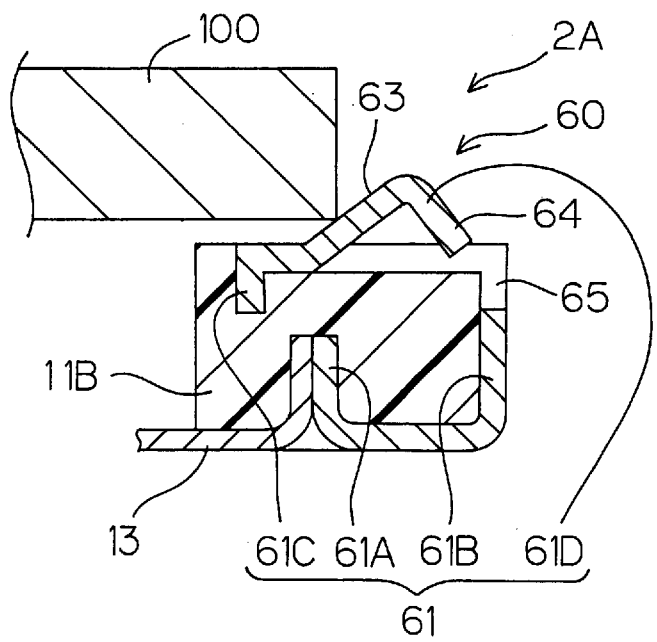

FIGS. 9A and 9B illustrate a third card lock mechanism 60. In this case, the adaptor 1 includes earth clips 61, 62, as shown in FIG. 9A, which are provided on opposite side edges thereof extending in the adaptor insertion direction R1 (see FIG. 1) so as to be brought into contact with earth terminals (not shown) in the card slot 301. The earth clips 61, 62 are composed of a conductive material such as stainless steel. The earth clip 62 located opposite from the card insertion port 2A is wrapped around the upper frame member 11T and the lower frame member 11B of the frame 11 and connected to the upper and lower metal covers 12, 13.

As shown in FIG. 9B, the earth clip 61 located adjacent the card insertion port 2A is wrapped around the lower frame member 11B of the frame 11 and connected to the lower metal cover 13. More specifically, the earth clip 61 is formed, for example, by working a stainless steel plate. The earth clip 61 includes a connection portion 61A extending inwardly of the lower frame member 11B and connected to the metal cover 13, a generally U-shaped wrap portion 61B extending from the connection portion 61A and wrapped around an edge of the lower frame member 11B, an anchored portion 61C bent at an end of the wrap portion 61B as extending inwardly of the lower frame member 11B, and an abutment portion 61D formed by incising and raising a part of the wrap portion 61B as projecting toward the card insertion port 2A.

The abutment portion 61D is curved as projecting toward the card insertion port 2A. An inclined surface of the abutment portion 61D facing to the card retaining space 2 serves as a restriction surface 63 to be brought into abutment against the rear edge of the inserted card 100 for prevention of the withdrawal of the card 100. The other inclined surface of the abutment portion 61D opposite from the card retaining space 2 serves as a guide surface 64 for guiding the card 100 during the insertion of the card toward the card insertion port 2A. Since the card 100 can be brought into angled contact with the adaptor in the cut-away portion 12A of the metal cover 12 when the card 100 is to be inserted into the adaptor 1, the guiding function of the guide surface 64 is not so important. However, a distal end of the abutment portion 61D is directed into an opening 65 formed in the wrap portion 61B by the incision and, therefore, this arrangement advantageously prevents the abutment portion 61D from injuring a user's finger.

The card lock mechanism 60 having the aforesaid construction provides the same effects as the first and second card lock mechanisms 50, 55. In addition, the lock mechanism can be provided by utilizing the earth clips which are essential components for a communications card or the like, so that an increase in costs can advantageously be suppressed.

Figure 10:
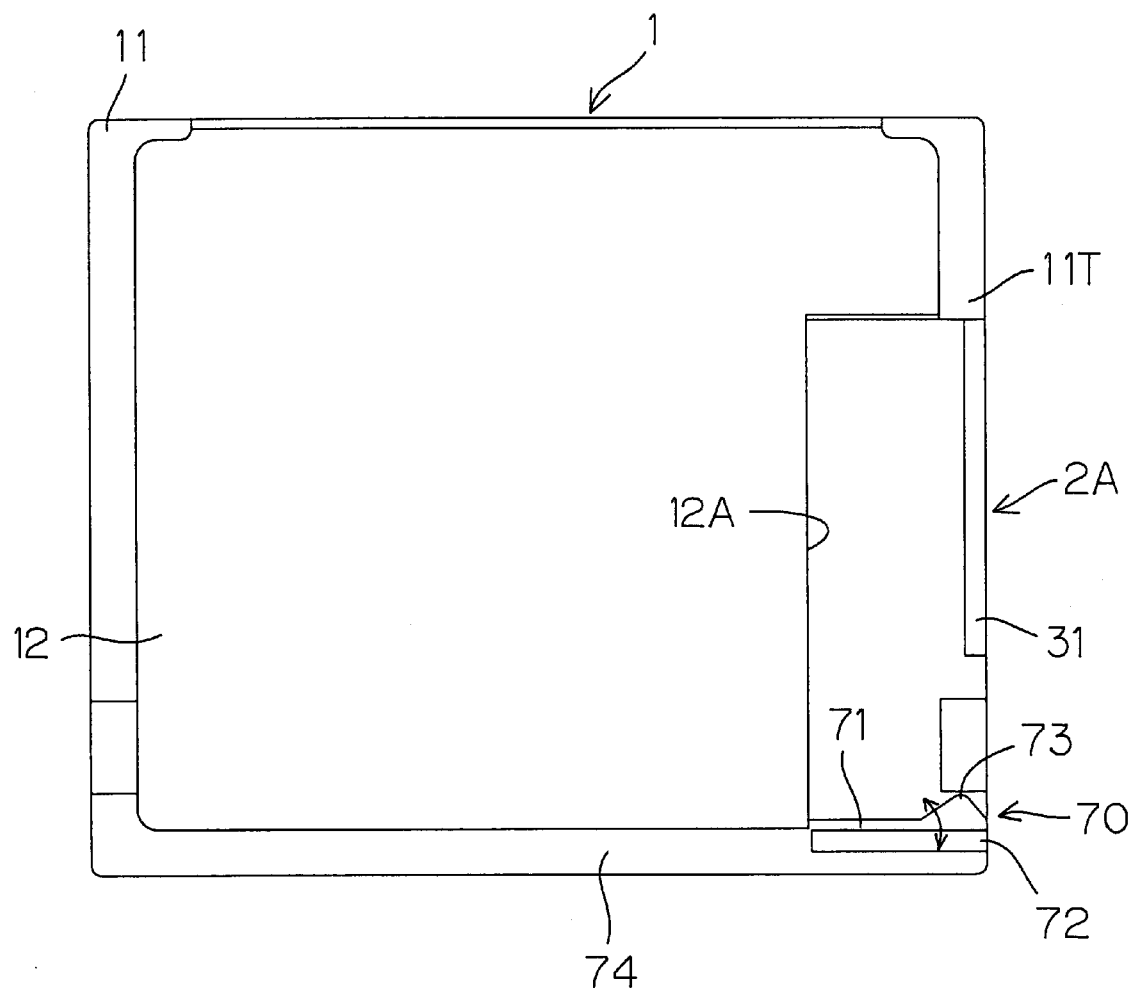
FIG. 10 is a diagram illustrating a fourth card lock mechanism.

FIG. 10 illustrates a fourth card lock mechanism 70. The card lock mechanism 70 includes a resilient lock piece 71 formed integrally with the upper frame member 11T molded of a resin. More specifically, a groove 72 is formed in a distal end portion of a rear beam 74 of the upper frame member 11T adjacent to the card insertion port 2A, and the resilient lock piece 71 is provided along the groove 72 adjacent the card insertion port 2A. An abutment portion 73 to be brought into abutment against the rear edge of the card 100 is provided at a distal end of the resilient lock piece 71.

In the course of the insertion of the card 100, the abutment portion 73 abuts against a side edge of the card 100, so that the resilient lock piece 71 is resiliently deformed thereby to be retracted into the groove 72. When the card 100 is completely inserted in the adaptor, the resilient lock piece 71 returns to its original position, and the abutment portion 73 abuts against one of the rounded corners on the rear edge of the card 100.

Thus, the card lock mechanism 70 provides the same effects as the first card lock mechanism 50 and the like. Since the card lock mechanism 70 is integral with the frame 11, there is no need for preparation of an additional component. Therefore, this arrangement is advantageous in terms of costs, and allows for easier fabrication of the adaptor 1.

FIGS. 11A and 11B illustrate a fifth card lock mechanism 75. The card lock mechanism 75 has a lock beam 76 (lock piece) provided slidably and retractably with respect to the card insertion port 2A. The lock beam 76 is slidably engaged with a through-hole 77 which is formed in the lower surface of the upper frame member 11T as extending through the frame 11 perpendicularly to the card insertion direction R2 (see FIG. 1). The lock beam 76 has a movement restricting portion 76A formed integrally therewith as projecting from the midportion thereof, and the through-hole 77 has a greater width portion 77A provided at the midportion thereof for permitting the movement restricting portion 76 to slide within a predetermined range. Thus, the lock beam 76 can slidably be displaced within the predetermined stroke range without disengaging from the frame 11. More specifically, the lock beam 76 can assume a lock state where one end thereof adjacent to the card insertion port 2A projects into the card insertion port 2A by a predetermined length and the other end thereof is retained in the through-hole 77, and an unlock state where the one end thereof adjacent to the card insertion port 2A is retained in the through-hole 77 and the other end thereof projects outwardly of the frame 11. F or switching of the lock be am 76 between the lock state and the unlock state, either of the end portions thereof projecting from the through-hole 77 is pressed into the through-hole 77.

When the card 100 is to be fitted in the adaptor, the insertion of the card 100 can easily be achieved with the lock beam 76 being in the unlock state. After the completion of the insertion of the card 100, the lock beam 76 is brought into the lock state thereby to assuredly prevent disengagement of the card 100. In the lock state, a distal end portion of the lock beam 76 abuts against the rear edge of the card 100.

A compressive coil spring may be fitted around the lock beam 76 in the greater width portion 77A of the through-hole 77 to bias the lock beam 76 into the lock state. Thus, the lock beam 76 is prevented from needlessly projecting outwardly of the frame 11 for prevention of damage of the lock beam 76.

Figure 12A:
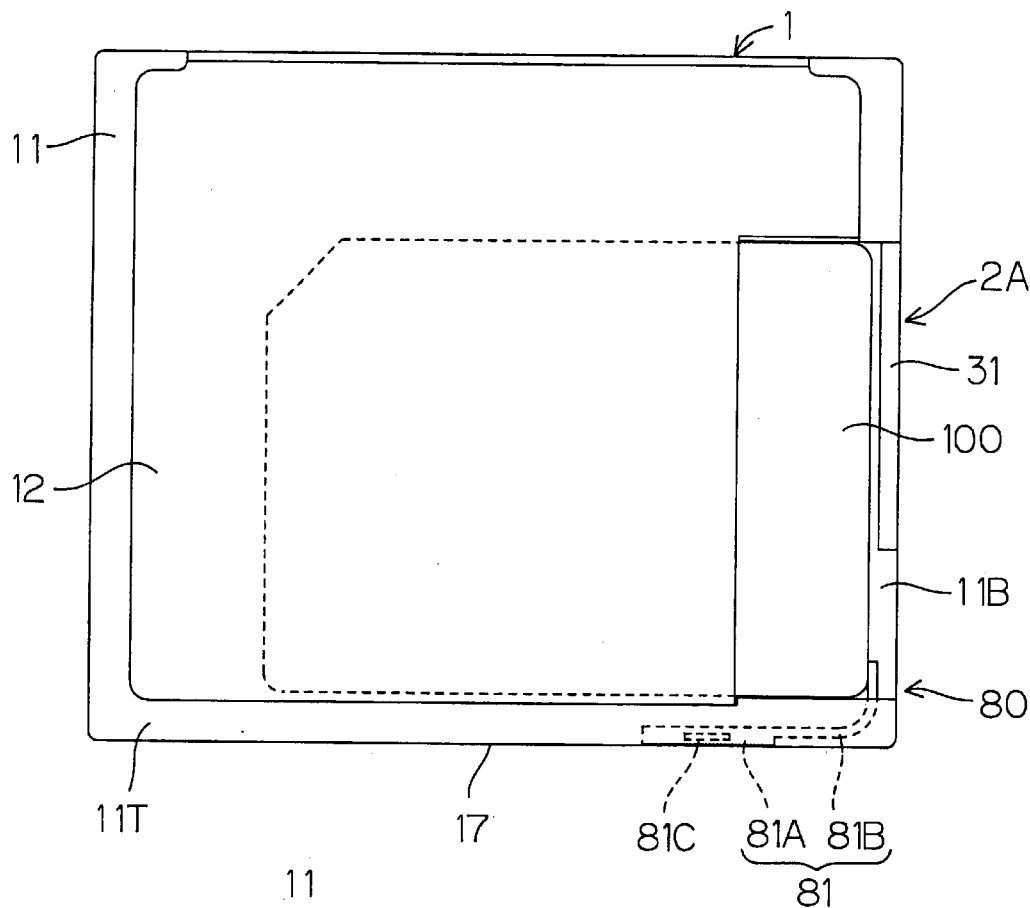
FIGS. 12A, 12B and 12C are diagrams illustrating a sixth card lock mechanism.
Figure 12B:
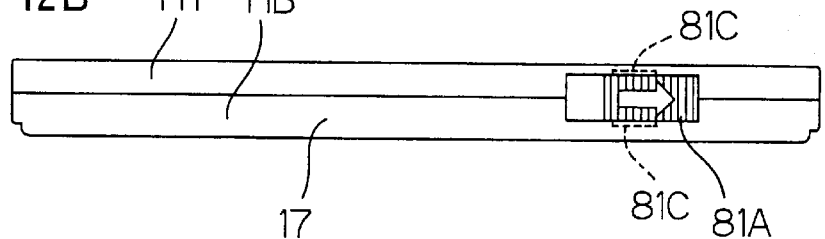
Figure 12C:
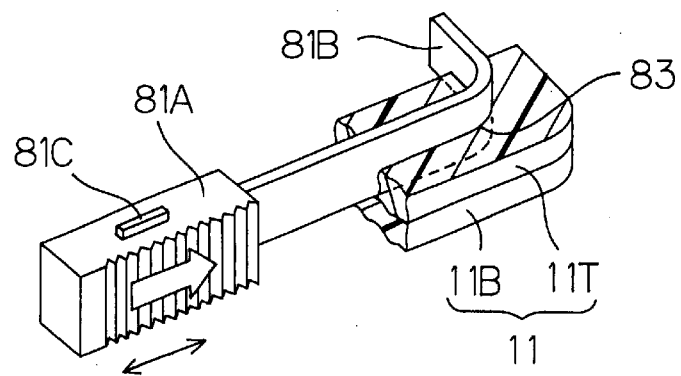

FIGS. 12A, 12B and 12C illustrate a sixth card lock mechanism 80. The card lock mechanism 80 has a slide lock piece 81 incorporated in the frame 11 in a slidable manner. The slide lock piece 81 has an operation portion 81A exposed on the rear face 17 of the frame 11 to be slid by an user, and an elongated abutment portion 81B (lock piece) extending from the operation portion 81A to be brought into abutment against the rear edge of the card 100. Slide portions 81C slidable along guide grooves (not shown) of the frame 11 are provided integrally with upper and lower faces of the operation portion 81A.

A curved guide groove 83 of generally L-shape for guiding the abutment portion 81B is formed in the upper frame member 11T. The curved guide groove 83 has a portion extending in the direction of sliding of the operation portion 81A, and a portion curved from this portion toward the card insertion port 2A. By sliding the operation portion 81A, the abutment portion 81B is allowed to assume a lock state where it projects in the card insertion port 2A and an unlock state where it is retracted in the curved guide groove 83. To allow for the displacement of the slide lock piece 81, however, at least the abutment portion 81B of the slide lock piece 81 should be composed of a flexible material so as to be deformable in conformity with the shape of the curved guide groove 83. An example of the material is nylon.

FIGS. 13A, 13B and 13C are diagrams illustrating the construction of another adaptor 90 suitable for use with the aforesaid card connection adaptor 1. Particularly, FIG. 13A is a plan view of the adaptor 90, and FIGS. 13B and 13C are enlarged partial side views of the adaptor 90. The adaptor 90 is used for fitting a CF card in a PC card slot for adaptation of the CF card to the PC card slot. The adaptor 90 includes a slot connector 91 provided on a front edge thereof for connection to a connector in the PC card slot, and a CF card fitting portion 92 provided on a rear edge thereof. The CF card fitting portion 92 has a cut-away portion 92A, and a card connector 92B provided inwardly of the cut-away portion 92A for connection to the CF card. A pair of arms 93, 94 define the cut-away portion 92A, and keys (not shown) are provided on interior side walls of the arms 93, 49 for engagement with misinsertion prevention keys provided on opposite side faces of the CF card.

Therefore, the adaptor 90 is fitted in the PC card slot with the CF card being fitted in the CF card fitting portion 92, whereby the CF card can electrically be connected to an information system with the use of the PC card slot.

Instead of the CF card, the aforesaid adaptor 1 can be fitted in the adaptor 90. Therefore, the adaptor 1 fitted with the MultiMedia card 100 is fitted in the adaptor 90, which is in turn inserted into the PC card slot. Thus, the MultiMedia card 100 can electrically be connected to the information system with the use of the PC card slot.

As shown in FIGS. 13B and 13C, a through-hole (window) 95 is formed in the arm 94 of the adaptor 90 adjacent to the card insertion port 2A of the adaptor 1 to communicate with a space inside the cut-away portion 92A. The through-hole 95 is located in such a position that a side face of the lower frame member 11B of the adaptor 1 and the rear edge of the card 100 retained in the card retaining space 2 can be seen through the through-hole. Therefore, where no card is fitted in the CF card fitting portion 92, a state as shown in FIG. 13B is observed. Where the adaptor 1 retaining therein the card 100 is fitted in the CF card fitting portion 92, a state as shown in FIG. 13C is observed. By viewing the inside of the cut-away portion 92A from the through-hole 95, a state where the CF card is retained in the adaptor 90 or a state where the adaptor 1 not fitted with the card 100 is retained in the adaptor 90 can also be observed.

In the information system designed to use the adaptor 90, a window is preferably provided in an externally viewable manner to be associated with the through-hole 95. Thus, it can be checked whether the CF card, the MultiMedia card or the adaptor 1 is fitted in the adaptor 90, without removing the adaptor 90 from the information system.

While the embodiments of the present invention have thus been described, the invention can be embodied in any other ways. Although the card connection adaptor explained in the aforesaid embodiment is designed to adapt the MultiMedia card to the Type-I CF card slot, the invention is also applicable to conversion between any other different standards. If the card inserted in the adaptor projects rearwardly of the adaptor in the card inserting direction, however, it is impossible to insert the adaptor into the card slot. Therefore, physical limitations may be imposed on combinations of the card standards for use with ordinary card slots.

Table 1 shows possible combinations of a standard to be employed as the first standard for the card slot and a standard to be employed as the second standard for the card. In Table 1, the present invention is applicable to combinations of standards indicated by "o" and is not applicable to combinations of standards indicated by "X".

It is noted that the combinations of standards indicated by "X" include those to which the invention will be applicable if a design modification of the card slot such as widening of the card insertion port of the card slot is made as required by market demands.

TABLE 1

| | | Card | | | | | | | | | | | |
|---|---|---|---|---|---|---|---|---|---|---|---|---|---|
| | | PC | | | SPC | | | CF | | | | | | |
| Card Slot | | Type I | Type II | Type III | Type I | Type II | Type III | Type I | Type II | SM | MMC | MS | MC | SIM |
| PC | Type I | | X | X | O | X | X | O | X | O | O | O | X | O |
| | Type II | X | | X | O | O | X | O | O | O | O | O | O | O |
| | Type III | X | X | | O | O | O | O | O | O | O | O | O | O |
| SPC | Type I | X | X | X | | X | X | X | X | X | O | X | X | O |
| | Type II | X | X | X | X | | X | X | X | X | O | X | O | O |
| | Type III | X | X | X | X | X | | X | X | X | O | X | O | O |
| CF | Type I | X | X | X | X | X | X | | X | X | O | X | X | O |
| | Type II | X | X | X | X | X | X | X | | X | O | X | O | O |

Although the embodiment described above is directed to a case where the card insertion port opens perpendicularly to the adaptor insertion direction, the advantage of the invention for easier card insertion is also ensured by providing the card insertion port on the rear face of the adaptor with respect to the adaptor insertion direction. More specifically, the card insertion port is provided on the rear face of the said adaptor with respect to the adaptor insertion direction, and the cut-away portion having a greater width than the card is formed in the upper cover as recessed in the adaptor insertion direction (which is parallel to the card insertion direction in this case).

Although the guide portion 36 is provided on the inner frame member 11C in the embodiment described above, the back surface of the wiring board 40 (opposed to the upper metal cover 12) may serve as a guide for guiding the front edge of the card 100 without the provision of the guide portion 36.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application claims priority benefits under the Convention on the basis of Japanese Patent Application No. 11-116814 filed to the Japanese Patent Office on Apr. 23, 1999, the disclosure thereof being in corporated herein by reference.

What is claimed is:

1. A card connection adapter for connecting a card slot to a card by fitting the card in the card slot, the card connection adapter comprising:

a first connector;

a second connector; and a card-shaped housing which holds the first connector and the second connector;

the housing having a first cover that covers a frame, a card retaining space defined in the housing for retaining therein the card, and a card insertion port provided on one end face thereof and communicating with the card retaining space;

the first cover formed with a cut-away portion that is recessed from the card insertion port end face in a card insertion direction, the cut away portion having a greater width than the card.

2. The card connection adapter as set forth in claim 1, wherein the card retaining space is defined between the frame and the first cover, the card connection adapter further comprising a guide portion exposed from the cut-away portion for guiding a front edge of the second-standard-compliant card with respect to the card insertion direction toward the card retaining space.

3. The card connection adapter as set forth in claim 1, wherein the frame holds signal conversion circuitry for mutual signal conversion between the first standard an the second standard between the card retaining space and the second cover.

4. The card connection adapter as set forth in claim 1, further comprising:

a protector extending to a position opposed to the cutaway portion of the first cover for protection of the inside of the card connection adapter.

5. The card connection adapter as set forth in claim 4, which further comprises a second cover that supports said protector, wherein the frame is held between the first and second covers.

6. The card connection adapter as set forth in claim 1, wherein the card insertion port opens in a direction generally perpendicular to an adapter insertion direction in which the card connection adapter is inserted into the card slot.

7. The card connection adapter as set forth in claim 1, wherein a misinsertion prevention key is provided on an end face of the frame adjacent to the card insertion port for preventing the card connection adapter from being inserted into the card slot in a wrong orientation.

8. The card connection adapter as set forth in claim 1, further comprising a card lock mechanism to be brought into abutment against a rear edge of the card retained in the card retaining space for prevention of withdrawal of the card.

9. The card connection adapter as set forth in claim 8, wherein the card lock mechanism comprises an abutment portion provided retractably with respect to the card insertion port, and a biasing member for resiliently biasing the abutment portion toward the card insertion port.

10. The card connection adapter as set forth in claim 9, wherein the biasing member includes a plate spring formed by incising and raising a portion of an earth clip.

11. The card connection adapter as set forth in claim 8, wherein the card lock mechanism comprises a lock piece having an abutment portion which is manually displaceable in a retractable manner with respect to the card insertion port.

12. A card connection adapter for connecting a card slot to a card by fitting the card in the card slot, the card connection adapter comprising:

a first connector;

a second connector; and a card-shaped housing which holds the first connector and the second connector;

the housing having a first cover that covers a frame, a card retaining space defined in the housing for retaining therein the card, and a card insertion port provided on one end face thereof and communicating with the card retaining space;

the first cover formed with a cut-away portion that is recessed from the card insertion port end face in a card insertion direction, the cut away portion having a greater width than the card, and having a fold-back portion formed along an edge thereof defining the cut-away portion by folding back an edge portion thereof into the card retaining space.

13. The card connection adapter as set forth in claim 12, wherein the fold-back portion is provided along an edge of the first cover extending perpendicularly to the card insertion direction.

* * * * *